United States Patent Office 3,539,488
Patented Nov. 10, 1970

---

3,539,488
**RADIATION CURABLE POLYVINYL CHLO-
RIDE COMPOSITION CONTAINING TRI-
ALLYL ISOCYANURATE**
Oskar E. Klopfer and Edwin D. Hornbaker, Baton Rouge,
La., assignors to Ethyl Corporation, New York, N.Y.,
a corporation of Virginia
No Drawing. Filed Mar. 7, 1968, Ser. No. 711,225
Int. Cl. C08f 1/24
U.S. Cl. 204—159.17         17 Claims

ABSTRACT OF THE DISCLOSURE

A cross-linked, heat-stable vinyl halide resin and a process for preparing said resin comprising irradiating a mixture of polyvinyl halide and a polyfunctional allyl or vinyl monomer such as trimethylolpropane trimethacrylate, triallyl isocyanurate, and the like. Resultant cured polyvinyl halide resins have heat-deflection temperatures in excess of 90° C., when irradiated at dose levels of at least 1.0 megarad.

BACKGROUND OF THE INVENTION

Field of the invention

This invention relates to rigid, cross-linked polyvinyl halide resins. More particularly, the invention is concerned with irradiation cross-linking polyvinyl halide resins employing as a coreactant certain polyfunctional allyl and vinyl monomers.

Description of the prior art

Vinyl halide resins, for example, polyvinyl chloride, are used extensively as insulation for electrical conductors and other potentially high temperature applications. However, there are a number of applications where resistance to elevated temperatures is a requirement which the thermoplastic vinyl halide resins cannot satisfy. This is due to the fact that rigid vinyl halide compounds begin to soften and readily deform or decompose under load usually in the range of 80 to 125° C. This is equivalent to a standard heat deflection temperature range of from about 65° to 75° C. under a load of 264 p.s.i. (18.5 kg./cm.$^2$).

In an effort to make polyvinyl halide resins more resistant to these temperatures, many attempts have been made to effect cure or cross-linking of the resins. U.S. Pat. 3,351,604, issued Nov. 7, 1967 describes several of these attempts and in turn discloses yet another method for this purpose. The patent describes the use of certain plasticizers in admixture with polyvinyl halide and triallyl cyanurate, either alone or in the presence of a peroxide initiator. Curing was effected by the use of heat when peroxides were present or high energy ionizing radiation in their absence. Irradiation was conducted using from 50,000 electron volts to 20,000,000 electron volts or higher. The patentees discovered that other polyfunctional coreactants similar to the triallyl cyanurate were not effective when employed in the invention.

U.S. Pat. 3,125,546, issued Mar. 17, 1964, discloses high temperature curing of a substantially linear polymer with a minor portion of a polyfunctional allyl monomer in the presence of a free radical polymerization initiator. Typical polymers of the invention are polyethylene, polypropylene, natural rubber, cellulose acetobutyrate, cellulose acetate and polyvinyl chloride (PVC). Some of the polymers were irradiated at a dose level of about 20 megarads in order to effect a cure of the polymeric resin.

One of the most important advantages to be derived from curing or cross-linking PVC is a substantial increase in heat stability. This is generally measured in terms of heat deflection temperature. The maintenance or improvement of desirable properties, such as tensile strength, modulus, impact and elongation, while important, is secondary to the principal aim of increasing heat stability. The primary goal in this approach is to increase heat stability while retaining as many as possible of other desirable properties in the resultant cured polymer.

These and related problems are overcome by the present invention, which is more fully described in the following specification and claims.

SUMMARY OF THE INVENTION

A rigid, cross-linked vinyl halide resin composition of matter consisting essentially of (A) 100 parts by weight of a vinyl halide resin selected from the class consisting of homopolymers of vinyl halides and copolymers of a major portion of a vinyl halide with an ethylenically unsaturated monomer copolymerizable therewith and (B) from about 10 to about 80 parts by weight of a polymerized polyfunctional unsaturated monomer selected from the group consisting of trimethylolpropane trimethacrylate, triallyl isocyanurate and pentaerythritol tetramethacrylate; said cross-linked resin having become crosslinked by high energy irradiation at a dose level of at least 1.0 megarad, to produce a cured polyvinyl halide resin having a heat deflection temperature in excess of 90° C.

Unexpectedly, it has also been discovered that the above composition may be prepared by mixing the polyvinyl halide resin and polyfunctional unsaturated monomer by standard techniques and at ordinary temperatures and then extruded or molded in any desired shape before being irradiated. The finished product is subsequently cured by directing high energy radiation upon the extruded or molded products, thus eliminating the need for special extrusion or molding equipment and avoiding possible polymer degradation by application of high temperatures to the polyvinyl halide resin.

DESCRIPTION OF THE PREFERRED EMBODIMENTS

The vinyl halide resins employed in the practice of this invention may be either the homopolymer or copolymers of a major portion of a vinyl halide with an ethylenically unsaturated monomer copolymerizable therewith. Among the polyvinyl halides suitable for the invention are polyvinyl chloride, polyvinyl fluoride and polyvinyl bromide. The most preferred polyvinyl halide is polyvinyl chloride.

Suitable ethylenically unsaturated monomers copolymerizable with vinyl chloride chloride are the alpha olefins, such as, ethylene. A particularly suitable vinyl chloride-ethylene copolymer contains from about 0.5 to about 12 weight percent ethylene. In addition, vinylesters of lower saturated aliphatic monocarboxylic acids containing up to about 6 carbon atoms are equally suitable as comonomers. Suitable among the viny lesters are vinyl acetate, vinyl propionate, vinyl hexanoate, and the like. A particularly suitable vinyl ester is vinyl acetate.

There are many other suitable monomers copolymerizable with vinyl halides such as vinyl chloride. These are exemplified by the vinyl alkyl ethers. The vinyl alkyl ethers useful in the present invention are vinyl cetyl ether, vinyl ethyl ether, vinyl propyl ether and the like. Generally, the alkyl present in the vinyl ether may have up to about 20 carbon atoms. Vinyl cetyl ether is particularly suitable in the present invention.

The most preferred vinyl halide resin useful in present invention is polyvinyl chloride (PVC). The PVC may be prepared by conventional polymerization processes, such as suspension, solution and bulk. However, suspension resins are especially useful in preparing the rigid, cross-linked resins of the present invention. Particularly useful PVC resins are sold commercially are "SM–250" and "SM–225" suspension PVC resins (sold by Ethyl Corporation). Other commercial PVC resins of this type are equally suitable.

The polyfunctional vinyl and allylic monomers which may be used as coreactants with the polyvinyl halide are trimethylolpropane trimethacrylate, triallyl isocyanurate, pentaerythritol tetramethacrylate, glycerol trimethacrylate, dipentaerythritol hexamethacrylate. However, it has been found that the preferred monomers are trimethylolpropane trimethacrylate and triallyl isocyanurate. Of these, the most preferred coreactant is trimethylolpropane trimethacrylate. In addition, diallyl phthalate may be used in conjunction with any of the above monomers, with satisfactory results and savings in over-all cost.

These coreactants are mixed with the polyvinyl halide in an amount ranging, on a weight basis, from about 10 to about 80 parts per hundred parts of polyvinyl halide resin (phr.). Most satisfactory cured resins are obtained when the mixture contains from about 20 to about 60 phr. of the coreactant.

Various stabilizers, lubricants and fillers may be blended with the polyvinyl halide resins, depending upon choice of resin and end use contemplated for the cured product. It has been found that the presence or absence of these materials have very little effect upon the curing of the polyvinyl halide.

The stabilizers which have been found useful in the present invention are Dyphos (National Lead Company), a dibasic lead phosphite; tert.-butylcatechol; Thermolite T–31 (Metal and Thermite Chemical Co.), a dibutyl tin dithiol glycolate; and Thermolite T–73 (Metal and Thermite Chemical Co.) a dialkyl tin mercaptide derivative. Other stabilizers known to be useful with PVC compounds are also generally acceptable for the composition of the invention.

Lubricants are sometimes useful in certain PVC compounds, and the same principles apply to the present invention. A particularly useful lubricant in the resin blend is stearic acid. Other lubricants that have been found advantageous are calcium stearate; N,N'-distearylethylene diamine, sold commercially as Advawax 280 (Advance Division, Carlisle Chemical Works, Inc.); glycerol monostearate; sodium stearate; and aliphatic esters of montanic acid.

Fillers that have been found to be acceptable are Cabosil (Cabot Corporation), a silica of millimicron size; microspheroidal silica gel; and carbon black. In addition, there are several commercially available fillers which are $CaCO_3$ coated with fatty acid calcium salts which have been found to be especially useful in the present invention. When these compounds are used in the invention, it may be advantageous to employ any of several commerically available coupling agents. A particularly good coupling agent for this purpose is $\gamma$-amionpropyltriethoxysilane, available commercially as "A–1100" (Union Carbide).

The irradiation source for curing the polyvinyl halide resins may be any conventional supply of high energy electrons. Preferred dose levels are in the range of from 1.0 to about 15 megarads. However, it is particularly advantageous to use irradiation does of from about 2.5 to about 10.0 megarads. Especially satisfactory results are achieved using a dose level of from about 5.0 to about 10.0 megarads.

It was discovered that an optimum range of irradiation doses existed in many cases within which good resin curing occurred. Irradiation at dose levels below or above this range produced heat deflection temperatures (DT) which were not satisfactory. There was observed a loss in DT as this optimum dose range of irradiation was exceeded, thus, establishing a need for rather careful control of total irradiation to be received by the resin products.

According to the invention, the polyvinyl halide is mixed with the polyfunctional unsaturated monomer and fillers, sensitizers, stabilizers, etc., heated to the proper extrusion or molding temperature, and extruded or molded into the desired shapes by conventional means or formed into sheets by calendering and then subsequently irradiated to produce the cross-linking.

Preparation of the samples for irradiation

The compounds were prepared by thoroughly mixing the various ingredients in a Hobart Mixer. In order to obtain a good distribution it was necessary to dissolve the polyfunctional unsaturated monomer in benzene. After mixing, the benzene was removed under mild conditions, generally at 45° C., under vacuum. A stabilizer, about 0.1 phr. tert.-butylcatechol, was added for the subsequent operations at elevated temperatures.

In order to avoid loss of the very low density fillers, they were wetted with methanol or propanol-2, which also was removed in vacuo subsequent to blending.

The dry blends were then milled on a 350° F. hot two-roll mill to form a sheet from which test pieces of 6 x 6 x ⅛ inch were molded to a platen temperature of 350° F. For the determination of heat deflection temperatures (DT), these were cut into 6 x ½ x ⅛ inch test bars which then were irradiated.

The irradiation of the samples was carried using a 1.5 MEV Dynamitron electron accelerator (Radiation Dynamics, Inc.). The samples were treated in air with dose levels of 1.0, 2.5, 5.0, 7.5 and 10.0 megarad.

All samples prepared according to the invention were tested for deflection temperature under load by the method set forth in ASTM D648–56 (1961). This test measures the temperature at which the test bar of resin is deflected 0.25 mm. (0.010 inch) while under a constant load of 264 pounds per square inch (p.s.i.).

The tensile properties of the cured resins were determined according to testing methods in ASTM D638–64T. This method is used in determining the comparative tensile properties of plastics in the form of standard test specimens and when tested under defined conditions of pretreatment, temperature, humidity, and testing machine speed. The speed of testing in this series of experiments was (Speed B) 0.51 to 0.64 cm. (0.20 to 0.25 inch) per minute. Tensile strength, percentage elongation and elastic modulus are all described in this test.

EXAMPLE 1

The test specimens were prepared as above, and contained 100 parts of "SM–225" PVC suspension resin (Ethyl Corporation) mixed with 50 phr. trimethylolpropane trimethylacrylate. The PVC was stabilized with 5 phr. Dyphos (National Lead Company), a dibasic lead phosphite, and lubricated with 0.75 phr. stearic acid.

Deflection temperatures were measured on samples that had been irradiated at (a) zero, (b) 5.0 and (c) 7.5 megarads. The unirradiated sample had a DT of less than 30° C., while samples (b) and (c), respectively, had DT's of 97.5° and 95.5° C.

EXAMPLES 2–4

The formulation in Example 1 was prepared with the addition of fillers. Again, 50 phr. trimethylolpropane trimethacrylate was blended with the PVC suspension resin, "SM–250" (Ethyl Corporation). To this was added: (Ex.

2) 20 phr. Cabosil (Cabot Corp.); (Ex. 3) 20 phr. microspheroidal silica gel; and (Ex. 4) 20 phr. Omya BSH, a $CaCO_3$ coated with a calcium salt of a fatty acid (Pluess-Stauffer, Inc.).

The samples were irradiated at doses ranging from 0–10.0 megarads. It was observed that in addition to the great improvement in DT, there was an accompanying increase in tensile yield strength and elastic modulus. The results of these experiments are found in Table I.

TABLE I.—PHYSICAL PROPERTIES OF PVC-TRIMETHYLOLPROPANE TRIMETHACRYLATE

[Blends after irradiation cross-linking (with fillers)]

| Example | Deflection temperature, DT, °C. | | | | Tensile yield strength, p.s.i. | | | Elastic modulus, ×10³ | | |
|---|---|---|---|---|---|---|---|---|---|---|
| | mr.[a] | 5 mr. | 7.5 mr. | 10 mr. | 0 mr. | 5 mr. | 7.5 mr. | 0 mr. | 5.0 mr. | 7.5 mr. |
| 2[b] | <30.0 | 101.5 | 103.0 | 99.5 | 3,230 | 9,394 | 9,456 | 210 | 714 | 728 |
| 3[b] | <30.0 | 90.5 | 99.0 | 99.5 | 2,200 | 6,992 | | 171 | 578 | |
| 4[b] | <30.0 | 101.0 | 98.5 | 98.0 | 2,970 | 5,513 | | 72 | 434 | |

[a] Mr.—Abbreviation for megarad.
[b] Percent elongation after irradiation was nil, due to the rigid nature of the cross-linked samples. However, before irradiation, the samples had percent elongation values ranging from 70 (Ex. 2) up to 200 (Ex. 4).

EXAMPLE 5

The procedure of Example 1 was repeated, substituting as the polyfunctional monomer triallyl isocyanurate at a level of 50 phr. in the blend. Although the usual stabilizer was added to the mixture, there was no filler present in the blend. The test specimens were subjected to irradiation of from 0 to 10 megarads and heat deflection measurements taken on the cured samples. The maximum DT was 91.0, for the 10 megarad specimen. There was also approximately a three-fold increase in tensile yield strength and elastic modulus in the 5.0 and 10.0 megarad samples.

EXAMPLE 6

To demonstrate the feasibility of using a mixture of two or more polyfunctional unsaturated monomers in obtaining satisfactory cross-linking, 100 parts PVC were mixed with 25 parts diallyl phthalate and 25 parts trimethylolpropane trimethacrylate. The specimen strips were irradiated at dose levels ranging from 0 to 10 megarads, the general procedure for sample preparation and irradiation set forth, above, being followed. When the test specimens were measured for heat deflection temperatures, it was found that before irradiation, the DT was less than 30° C., while the specimen irradiated at 10 megarad had a DT of 93° C. The physical properties of the samples were consistent with those, above, in the previous examples.

EXAMPLE 7

The experiment was repeated following the procedure of Example 6, substituting 25 parts triallyl isocyanurate for the 25 parts diallyl phythalate. Irradiation levels used in curing the samples were also the same as above. The DT of the 0 megarad sample was 40.5° C., while the DT of the cured samples was 94.0° C. Again, physical properties of the cured resin were much better than the uncured resin.

The vast increase in load bearing capabilities at high temperatures provides the polyvinyl halide resins of the invention wide applicability in pipe extrusions for high temperature applications. This area of use for polyvinyl chloride pipe, particularly, has been denied in the past due to the tendency of polyvinyl chloride to deform at the higher temperatures. In addition, polyvinyl chloride cured by the present methods has utility as rigid sheeting material in the building and construction trade.

We claim:

1. A rigid, cross-linked vinyl halide resin composition of matter comprising (A) 100 parts by weight of a vinyl halide resin selected from the group consisting of homopolymers of vinyl halides and copolymers of a major portion of a vinyl halide with an ethylenically unsaturated monomer copolymerizable therewith and (B) from about 10 to about 80 parts by weight of triallyl isocyanurate; said cross-linked resin having become cross-linked by high energy irradiation at a dose level of at least 1.0 megarad, to produce a cured polyvinyl halide resin having a heat deflection temperature in excess of 90° C.

2. A rigid, cross-linked vinyl halide resin composition of matter comprising (A) 100 parts by weight of a vinyl halide resin selected from the class consisting of homopolymers of vinyl halides and copolymers of a major portion of a vinyl halide with an ethylenically unsaturated monomer copolymerizable therewith and (B) from about 10 to about 80 parts by weight of diallyl phthalate, and triallyl isocyanurate, said diallyl phthalate being present in an amount up to about 50 weight percent of the combined ployfunctional unsaturated monomers; said cross-linked resin having become cross-linked by high energy irradiation at a dose level of at least 1.0 megarad, to produce a cured polyvinyl halide resin having a heat deflection temperature in excess of 90° C.

3. The rigid, cross-linked vinyl halide resin of claim 1, wherein said vinyl halide resin is polyvinyl chloride.

4. The rigid, cross-linked vinyl halide resin of claim 2, wherein said vinyl halide resin is polyvinyl chloride.

5. The rigid, cross-linked vinyl halide resin of claim 1, wherein there is from about 20 to about 60 parts by weight of said triallyl isocyanurate monomer contained therein.

6. A process for preparing a rigid, cross-linked vinyl halide resin comprising intimately mixing (A) 100 parts by weight of a vinyl halide resin selected from the class consisting of homopolymers of vinyl halides and copolymers of a major portion of a vinyl halide with an ethylenically unsaturated monomer copolymerizable therewith, with (B) from about 10 to about 80 parts by weight of triallyl isocyanurate; heating said mixture to a temperature whereby said mixture is in a state suitable for extrusion; extruding said mixture and subsequently irradiating said extruded resin mixture at a dose level of at least 1.0 megarad.

7. The process of clim 6, wherein said mixture is heated to a temperature whereby said mixture is in a state suitable for injection molding; injection molding said mixture and subsequently irradiating said injection molded resin mixture at a dose level of at least 1.0 megarad.

8. The process of claim 6, wherein said extruded resin mixture is irradiated at a dose level of from about 5 to about 10 megarad.

9. The process of claim 6, wherein said heated resin mixture is formed into objects by calendering and subsequently irradiated at a dose level of from about 5 to about 10 megarad.

10. The process of claim 7, wherein said injection molded resin mixture is irradiated at a dose level of from about 5 to about 10 megarad.

11. The process of claim 6, wherein said vinyl halide resin is polyvinyl chloride.

12. The process of claim 6, wherein said vinyl halide resin is mixed with from about 20 to about 60 parts by weight triallyl isocyanurate.

13. A process for preparing a rigid, cross-linked vinyl halide resin comprising intimately mixing (A) 100 parts by weight of a vinyl halide resin selected from the class consisting of homopolymers of vinyl halides and copolymers of a major portion of a vinyl halide with an ethylenically unsaturated monomer copolymerizable therewith, with (B) from about 10 to about 80 parts by weight of at least two polyfunctional unsaturated monomers, one of which is diallyl phthalate, the other of which is triallyl isocyanurate, said diallyl phthalate being present in an amount up to about 50 weight percent of the combined polyfunctional unsaturated monomers; heating said mixture to a temperature whereby said mixture is in a state suitable for extrusion; extruding said mixture and subsequently irradiating said extruded resin mixture at a dose level of at least 1.0 megarad.

14. The process of claim 13, wherein said resin mixture is heated to a temperature whereby said mixture is in a state suitable for injection molding; injection molding said heated resin mixture and subsequently irradiating said injection molded resin mixture at a dose level of at least 1.0 megarad.

15. The process of claim 13, wherein said heated resin mixture is formed into objects by calendering and subsequently irradiated at a dose level of from about 5 to about 10 megarad.

16. The process of claim 13, wherein said vinyl halide resin is polyvinyl chloride.

17. The process of claim 13, wherein said vinyl halide resin is polyvinyl chloride and is mixed with from about 20 to 60 parts by weight of equal weight percent of diallyl phthalate and triallyl isocyanurate; said resin mixture formed into an object by plastic forming means and subsequently irradiated at a dose level of from 5 to about 10 megarad.

References Cited

UNITED STATES PATENTS 3,359,193   12/1967   Pinner _____ 204—159.17
3,312,757   4/1967    McRitchie _____ 260—878

MURRAY TILLMAN, Primary Examiner

R. B. TURER, Assistant Examiner

U.S. Cl. X.R.

260—23, 41, 878, 899

PO-1050
(5/69)

UNITED STATES PATENT OFFICE
CERTIFICATE OF CORRECTION

Patent No. 3,539,488      Dated Nov. 10, 1970

Inventor(s) OSKAR E. KLOPFER

It is certified that error appears in the above-identified patent and that said Letters Patent are hereby corrected as shown below:

Column 2, line 54, reads "chloride chloride", should read -- chloride --; line 60 reads "viny lesters", should read -- vinyl esters --. Column 3, line 74, reads "does", should read -- doses --. Column 4, line 62, reads "trimethylacrylate", should read -- trimethyacrylate --. Column 5, line 52, reads "phythalate", should read -- phthal{ Column 6, line 26, reads "ployfunctional", should read -- polyfunctional --; line 51, reads "clim", should read -- claim --.

SIGNED AND
SEALED
MAR 9 1971

(SEAL)
Attest:

Edward M. Fletcher, Jr.
Attesting Officer

WILLIAM E. SCHUYLER, JR.
Commissioner of Patents